P. F. MILLIGAN.
Railroad Signal.
No. 30,979.
2 Sheets—Sheet 2.
Patented Dec. 18, 1860.
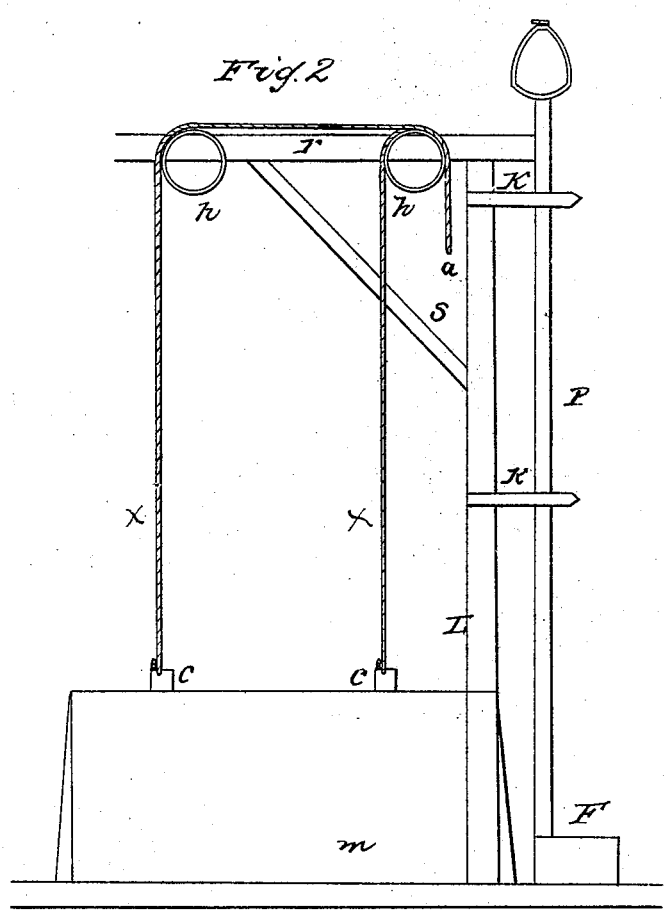

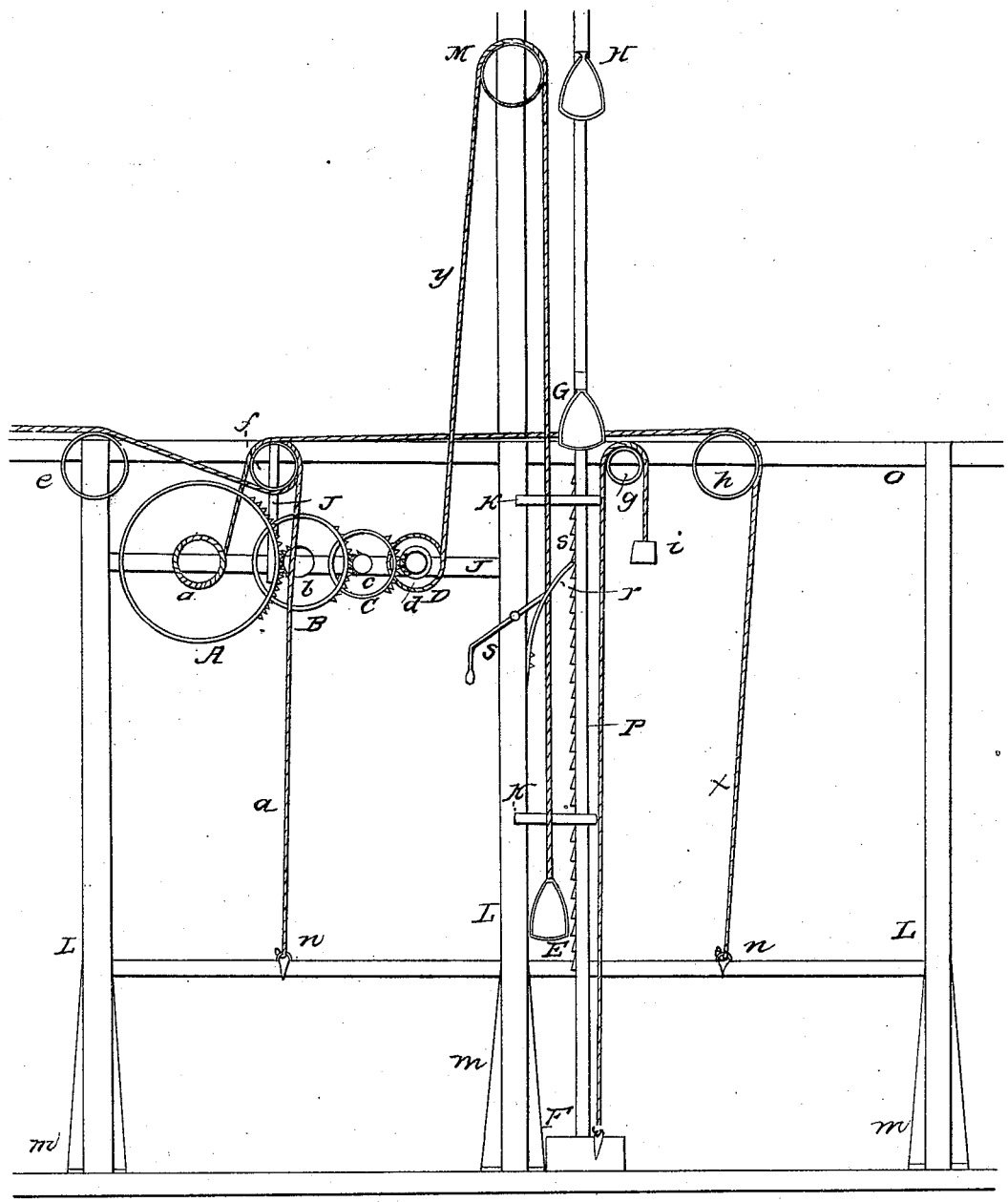
P. F. MILLIGAN.
Railroad Signal.
No. 30,979.
2 Sheets—Sheet 1.
Patented Dec. 18, 1860.

UNITED STATES PATENT OFFICE.

PATRICK FRANCIS MILLIGAN, OF BALTIMORE, MARYLAND.

RAILWAY-SIGNAL.

Specification of Letters Patent No. 30,979, dated December 18, 1860.

*To all whom it may concern:*

Be it known that I, PATRICK FRANCIS MILLIGAN, of Baltimore, State of Maryland, have invented a new and useful machine, which I call a compound high-water and deflection-indicator for bridges, culverts, &c., on railroads and thoroughfares, to warn the approaching trains of inundations, as also to signify when any deflection may be caused to said bridges, &c., by high water or other unknown causes by which they are caused to settle or deviate from their proper or sound position; and I do hereby declare that the following is a full, clear, and exact description of the construction and operation of the same, reference being had to the annexed drawings, making a part of this specification, in which—

Figure 1 is a perspective view, and Fig. 2 is a transverse section.

A Fig. 1, is a wheel, and *a* its axle, which drives the wheel B by its pinion *b*, which drives the wheel C by its pinion *c*, which drives the pulley or axle D by its pinion *d*.

J J is the frame in which the wheels, are arranged.

*y* is a chain passing from the pulley or axle D over the pulley M and carrying the radiant or lamp, E.

X X are two chains made fast to the two spans of a bridge at *n n* and passing in a perpendicular line over the pulley *h* and then horizontally and over the pulley or drum *f* and on to the axle *a* of the wheel A.

G is also a radiant or lamp, attached to the pole P and elevated to H by the float F in case of high water, *i* being a small weight, attached to the chain *x* and to the float F passing over the pulley *g* to keep the pole P nearly in equilibrium. In the pole P is attached the ratchet rack *s* and which is acted on by the spring *r* to keep it up, and which is released by the lever *s* to allow its descent.

*k k* are two eyes of iron or wood, through which the float pole P passes, which are mortised or driven into the pole L.

*m m m*, are the three piers or abutments of the bridge, and R is its side girder.

L L L are three poles, set on the base rack of the piers, one of which extends up to sustain the radiant or lamp, E. They are braced together by the joist O in a perpendicular position, and transversely to the bridge.

In Fig. 2, *m* is one of the piers L the upright pole, sustaining the lamp E in Fig. 1.

*r* is a transverse arm, mortised into the pole L and *s* a brace to support it.

*h h* are two pulleys over which the chains *x x* pass, spring from the two side girders *c c* of the bridge, and on to the axle *a* of the wheel A at *a*, as seen at Fig. 1.

P is the pole and F the float, carrying the radiant or lamp, G as seen at Fig. 1.

To enable others skilled in the art to construct and use my invention, I will proceed to describe its construction and operation. In any suitable frame of iron or wood J J I place a wheel A with 64 teeth, carrying an axle *a* of say 9 inches diameter. This wheel acts on the pinion *b* of 16 leaves, which carries the wheel B of 48 teeth driving the pinion *c* of 12 leaves which carries the wheel C of 36 teeth, which drives the pinion *d* of 9 leaves, and which carries the pulley D of 9 inches diameter on an axle, around which the chain *y* will coil. I then erect the poles, L L L on the piers *m m m* and I brace them together by the joist O in a perpendicular position and to the bridge by wood or iron braces, transversely. I then prepare a pole P with a ratchet rack *s* and I attach to its lower end a float F of any suitable property, and to its upper end a radiant or lamp, G painted red to be as a signal lamp, by light, in the night, and by its color in the day. I mortise or drive two eyes, *k k* of iron or wood, into the pole L through which the float P passes. Assisted in its upward passage by the weight *i* attached to the chain *x* and to the float F and passing over the pulley *g*, I then arrange a spring *r* which as the float ascends, keeps it up, until released by the lever *s* acted on by human agency. I then attach two chains *x x* to the center *n n* of the two spans of a bridge, and run them perpendicularly, over the pulley *h* and axle or drum *f* and horizontally and then on to the axle *a* of the wheel A.

*e* is a pulley to receive the chain of a third or more spans of the bridge. I then pass a chain *y* around the pulley or axle D and over the pulley M to which is attached the radiant E which hangs close to the bridge.

Now in case of an inundation, the float, F raises the lamp, G to the point H and as it cannot descend it will stand as a signal for an inundation. And as magnitudes, (which may be increased or diminished) have the same proportion to each other, as their like parts, it follows that, in case of any deflection being caused to any span of the bridge, that the radiant or lamp, E will be raised 64 inches for one inch deflection in the bridge, signifying, by a visible sign that some cause produced the effect and rendered an examination necessary. Thus an approaching train, is apprised not only of the position of the water, but is warned of any deflection which may have taken place, from the proper or sound position of the bridge.

How to apply the machine to both sides of the bridge, is clearly shown in Fig. 2, where the transverse arm $r$ sustains the pulleys $h$ $h$ bearing the chains $x$ $x$ from the sides of the bridge $c$ $c$ on to the axle $a$ of the wheel A Fig. 1, at $a$ Fig. 2.

I do not claim as my invention, radiants or lamps as a signal, nor do I claim any particular principle for a float, neither do I claim the part or parts of which my machine is composed, where applied to any other purpose whatever, but What I do claim, and desire to secure by Letters Patent, is:—

The combination and arangement of the series of wheels A B C D and pinions $b$ $c$ $d$ axle $a$, ropes or chains $x$ $y$ attached to spans $n$ $n$, lamps or signals E G, pole P with ratchet rack $s$ and spring $r$, with suitable framing. The whole constructed and operated substantially as and for the purpose specified.

P. F. MILLIGAN.

Witnesses:
F. I. MURPHEY,
H. JOHNSON.